No. 858,578. PATENTED JULY 2, 1907.
C. C. CRAWFORD.
ATTACHMENT FOR VEHICLES.
APPLICATION FILED MAR. 12, 1906.
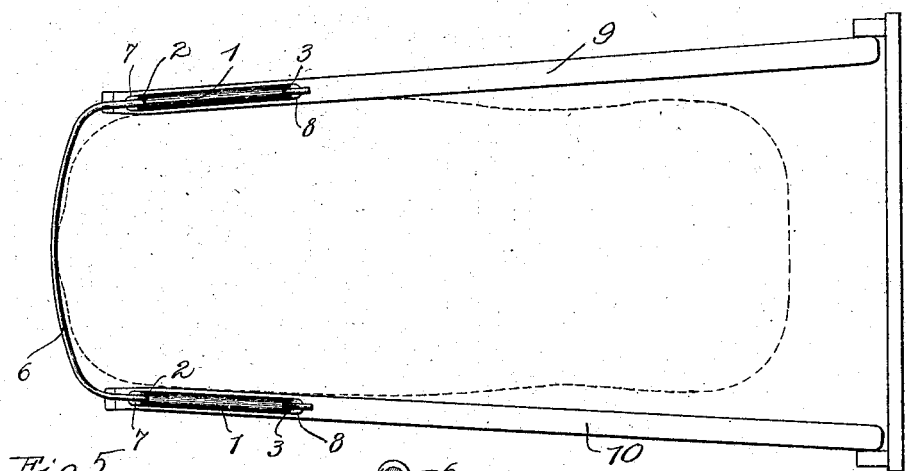
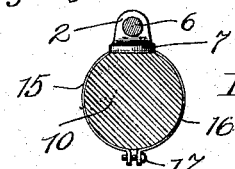 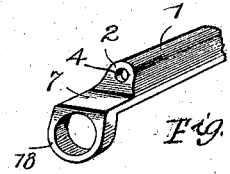
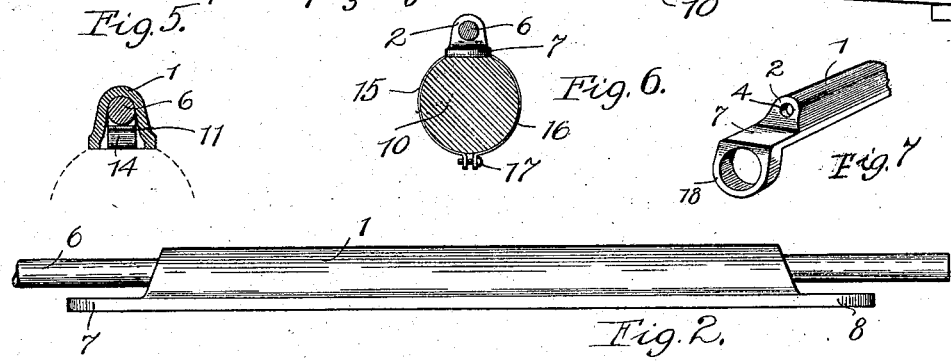
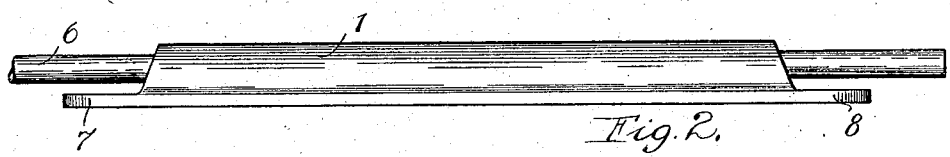
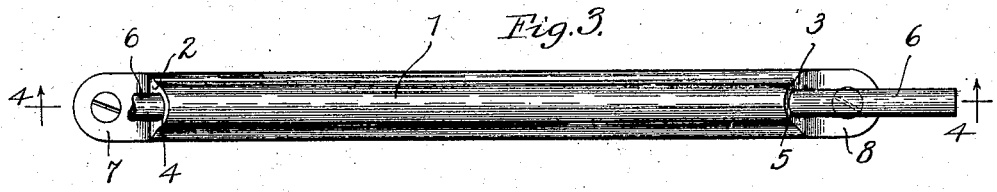
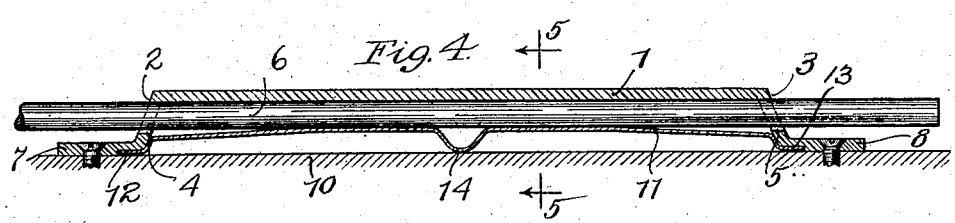
Witnesses:
Leonard W. Novander.
George E. Higham.
Inventor
Charles C. Crawford
By Charles A. Brown
Attorney

UNITED STATES PATENT OFFICE.

CHARLES C. CRAWFORD, OF WARSAW, ILLINOIS.

ATTACHMENT FOR VEHICLES.

No. 858,578.   Specification of Letters Patent.   Patented July 2, 1907.

Application filed March 12, 1906. Serial No. 305,461.

*To all whom it may concern:*

Be it known that I, CHARLES C. CRAWFORD, a citizen of the United States, residing at Warsaw, in the county of Hancock and State of Illinois, have invented a certain new and useful Improvement in Attachments for Vehicles, of which the following is a full, clear, concise, and exact description, reference being had to the accompanying drawings, forming a part of this specification.

My invention relates to attachments for vehicles for preventing interference of the pole or thill ends with the driving reins leading from the horse or other animals to the driver.

As is well known, the driving reins are apt to be caught below the pole or thill ends and my invention contemplates the use of a guard rod extending about the front of the horse from the thill or pole ends, the ends of the rod being adapted for separable engagement in improved clamping members which are preferably permanently secured to the pole or thill ends. After the horse has been hitched up, the guard rod ends are slipped into the clamping members and the rods then extend from the thill or pole ends about the front of the horse, thereby preventing the reins from falling below the pole or thill ends and being caught thereby.

My invention will be best understood by reference to the accompanying drawing, in which Figure 1 shows the thills of the vehicle to which my invention is applied, the outlines of a horse being shown in dotted lines. Fig. 2 is an elevation view of one of the clamping members showing the end of the rod in position therein. Fig. 3 is a top view of Fig. 2. Fig. 4 is a sectional view taken on line 4—4 of Fig. 3, the rod, however, being shown in full. Fig. 5 is a sectional view taken on line 5—5 of Fig. 4, and Figs. 6 and 7 show modified clamping arrangements for securing the clamping members in position.

Each clamping member is in the form of a comparatively hollow casting or punching having an arch-shaped body part 1 and end walls 2 and 3 having the openings 4 and 5 for receiving the ends of the bow-shaped guard rod 6. Lugs 7 and 8 also extend from the ends of the frame and are provided with screw holes for receiving screws which are to secure the frames in place. As shown in Fig. 1, the clamping frames are preferably secured at the ends of the thill rods 9 and 10. After the horse has been hitched up, the ends of the guard rod 6 are slipped through the openings of the frames and this guard rod then extends over the ends of the thills to prevent the reins from falling under and being caught by the thill ends.

To hold the guard rod in position I preferably provide friction clamping means within the frame, and in Fig. 4 I show spring means for providing frictional engagement, a spring 11 engaging in recesses 12 and 13 at the ends of the frame and having an offset part 14 at an intermediary point. When the ends of the guard rod are slipped into the frames the offsets of the springs bear against the thill surface and the rod ends are clamped between the spring and the tops of the clamping frames, and the guard rod is thus prevented from escape, although it may readily be pulled out when desired.

Instead of using screws for securing the frames in position, other clamping means may be used, as shown in Fig. 6, comprising the straps 15 and 16 engaging about the thill or pole and engaged at their ends by the clamping screw 17. Another way of securing the clamping frames may be that shown in Fig. 7, in which one extension 7 is extended to form a ring or ferrule 18 which slips over and encircles the front of the thill, the frame being then held in position by the screw passing through the rear extension 8. This extension 18 may be also a cap for engaging the front end of the thill. Many other means, however, may be used for securing the clamping frames in position.

Although my invention is described and shown as applied to thills, it may be applied with equal advantage to poles, such as the two poles of a three horse vehicle, or the like.

Other changes may also readily be made without departing from the scope of my invention, and I do not, therefore, wish to be limited to the arrangement herein shown and described.

What I claim as new and desire to secure by Letters Patent is:

1. In a device of the class described, the combination with an adjustable bow-shaped guard rod for extending from and between the ends of poles or thills of a vehicle, of clamping members secured to the pole or thill ends in which the guard rod ends are separably clamped in any adjusted position.

2. In a device of the class described, the combination with an adjustable guard rod extending from and between the ends of thills or poles of a vehicle, of clamping members secured to the thill or pole ends, said clamping members having longitudinal passageways for receiving the ends of the guard rod, and clamping means engaging in recesses in said clamping members for clamping the ends of the guard rods.

3. In a device of the class described, the combination with an adjustable guard rod extending from and between the ends of thills or poles of a vehicle, of clamping members secured to the thill or pole ends, said clamping members having longitudinal passageways for receiving the ends of the guard rod, and clamping means within the clamping members for engaging the ends of the guard rod and holding said rod in any adjusted position.

4. In mechanism of the class described, the combination with an adjustable guard frame in the form of a bow-shaped rod of uniform diameter, of clamping members secured to the ends of the thills or poles of a vehicle, the ends of said guard frame passing through said clamping members.

5. In mechanism of the class described, the combination with an adjustable guard frame in the form of a bow-shaped rod of uniform cross section throughout, of members secured to the ends of the thills or poles of a vehicle for receiving the ends of the rod, and clamping means within the members for holding the frame in position.

6. In mechanism of the class described, the combination with a guard frame in the form of a bow-shaped rod, of members secured to the ends of the thills or poles of a vehicle for receiving the ends of the rod, and frictional clamping means engaging in recesses within the members for holding the guard frame ends within the members.

7. In mechanism of the class described, the combination with an adjustable guard frame in the form of a bow-shaped rod, the ends of said rod extending longitudinal with the ends of the thills or poles of a vehicle, members secured to the ends of the thills or poles through which the ends of the guard frame pass, and a spring having an offset and engaging at its ends in recesses within the members and having frictional engagement with the frame ends for securing said frame to the members.

8. A device for preventing interference of thill or pole ends with the driving reins leading to the animal drawing a vehicle comprising members to be secured to the front ends of the thills or poles, and a guard frame in the form of a bow-shaped rod for engaging at its ends in said members, said guard frame having adjustable engagement thereto.

9. A device for preventing interference of thill or pole ends with the driving reins leading to the animal drawing a vehicle comprising members to be secured to the front ends of the thills or poles, and an adjustable guard frame in the form of a bow-shaped rod for engaging at its ends in said members, said guard frame being prevented from escapement from said members and in frictional engagement therewith.

10. In mechanism of the class described, the combination with an adjustable guard frame in the form of a bow-shaped rod of uniform cross-section, of members secured to the ends of the thills or poles of the vehicle, said members being in the form of hollow frames for receiving the ends of the guard frame, and spring clamping means within the frames for clamping the guard frame ends therein.

11. In mechanism of the class described, the combination with a guard frame in the form of a bow-shaped rod, of members secured to the ends of the thills or poles of the vehicle, said members being in the form of hollow frames for receiving the ends of the guard frame, and spring friction mechanism within the frames for adjustably holding the guard rod ends in frictional engagement with the frames.

12. In mechanism of the class described, the combination with an adjustable guard frame in the form of a bow-shaped rod, of members secured to the ends of the thills or poles of the vehicle, said members being in the form of hollow frames for receiving the ends of the guard frame said hollow frames having recesses, and spring clamping means within the frames engaging in said recesses for holding the guard rod ends in frictional engagement with the frames.

13. In mechanism of the class described, the combination with a guard frame in the form of a bow-shaped rod of approximately the same cross-section throughout, of members secured to the ends of the thills or poles of the vehicle, said members being in the form of hollow frames for receiving the ends of the guard frame, and a spring within each of the hollow frames, said spring having an offset at an intermediary point and engaging by its ends in recesses within said frames, said springs and frames forming means for holding the guard frame in any adjusted position.

14. In mechanism of the class described, the combination with an adjustable guard frame in the form of a bow-shaped rod, of members secured near the ends of the thills or poles of a vehicle, said members being in the form of hollow castings for receiving the ends of the guard frame, and spring mechanism within each of the hollow frames, said spring mechanism having a bent portion bearing against the thill or pole thereby forming greater frictional engagement between said hollow frames and said guard frame.

In witness whereof, I hereunto subscribe my name this 5th day of March A. D., 1906.

CHARLES C. CRAWFORD.

Witnesses:
J. W. BERLIN,
F. W. H. MILLER.